United States Patent

(12) United States Patent
Johnson

(10) Patent No.: US 9,366,778 B1
(45) Date of Patent: Jun. 14, 2016

(54) PULSE INDUCTION METAL DETECTOR WITH QUASI-RESONANT TRANSMITTER AND ASSOCIATED METHOD

(71) Applicant: First Texas Products, LLC, El Paso, TX (US)

(72) Inventor: David E. Johnson, El Paso, TX (US)

(*) Notice: Subject to any disclaimer, the term of this patent is extended or adjusted under 35 U.S.C. 154(b) by 0 days.

(21) Appl. No.: 14/198,670

(22) Filed: Mar. 6, 2014

Related U.S. Application Data

(60) Provisional application No. 61/773,195, filed on Mar. 6, 2013.

(51) Int. Cl.
| | |
|---|---|
| *G01V 3/15* | (2006.01) |
| *G01V 3/10* | (2006.01) |
| *H02J 17/00* | (2006.01) |
| *G01V 3/165* | (2006.01) |

(52) U.S. Cl.
CPC .. *G01V 3/10* (2013.01); *G01V 3/15* (2013.01); *G01V 3/165* (2013.01); *H02J 17/00* (2013.01)

(58) Field of Classification Search
CPC ........... G01V 3/15; G01V 3/08; G01V 3/081; G01V 3/104; G01V 3/12; G01V 3/107; G01V 3/101; G01V 3/102; G01V 3/105; G01V 3/10; G01V 3/165; E21B 47/02224; G01R 31/085; H02J 17/00
USPC .................................................. 324/326–329
See application file for complete search history.

(56) References Cited

U.S. PATENT DOCUMENTS

| | | | |
|---|---|---|---|
| 4,514,692 A | 4/1985 | Johnson et al. | |
| 4,628,265 A | 12/1986 | Johnson et al. | |
| 4,868,504 A | 9/1989 | Johnson | |
| 5,576,624 A | 11/1996 | Candy | |
| 6,686,742 B2 | 2/2004 | Candy | |
| 6,724,191 B1 * | 4/2004 | Larsen ........................ 324/329 |
| 8,629,677 B2 | 1/2014 | Earle | |

FOREIGN PATENT DOCUMENTS

GB          2071327 A          9/1981

* cited by examiner

*Primary Examiner* — Jay Patidar
(74) *Attorney, Agent, or Firm* — Faegre Baker Daniels LLP

(57) ABSTRACT

A pulse induction metal detector with a quasi-resonant transmitter and associated method is provided. The metal detector may be of the type such as is typically moved over the ground surface for the purpose of detecting buried metal objects. The quasi-resonant transmitter may include circuit apparatus to capture and recycle flyback energy and to transmit a pulsed magnetic field for energizing metal object to be detected.

19 Claims, 5 Drawing Sheets

PULSE INDUCTION METAL DETECTOR WITH QUASI-RESONANT TRANSMITTER AND ASSOCIATED METHOD

CROSS-REFERENCE TO RELATED APPLICATION

This application claims the benefit of U.S. Application Ser. No. 61/773,195, filed on Mar. 6, 2013, the disclosure of which is expressly incorporated herein by reference.

BACKGROUND AND SUMMARY OF THE DISCLOSURE

The present disclosure relates to hand-held and otherwise portable metal detectors such as are used for finding buried coins, historical artifacts, gold nuggets, unexploded ordnance or other metal objects. More particularly, the present disclosure relates to a quasi-resonant transmitter for a metal detector of the pulse induction type.

Metal detectors designed for portable use especially in the hand-held configuration are well known. Such metal detectors drive a varying electrical current through a transmit coil, the varying current producing a corresponding varying magnetic field. This varying magnetic field induces a varying voltage within the effective region of the field. The varying voltage induces a corresponding varying electrical current to flow in electrically conductive objects, for example, metal objects present in the field. The flow of current in the electrically conductive object distorts the field, and the resulting distortion of the field being detected electronically by receiving means incorporated into the metal detector. The presence of electrically conductive objects thus detected is indicated to the operator typically by audio and or visual means.

The principal technologies used in hand-held metal detectors are single-frequency sinusoidal induction balance commonly referred to as "VLF", multiple frequency induction balance with rectangular voltage drive to the transmit coil, and pulse induction "PI", the searchcoil of which may or may not be of the induction balance type. The features of the present disclosure relate to pulse induction technology.

Conventional pulse induction operates as a total loss system. The energy produced by the collapse of the magnetic field during flyback is dissipated in an ohmic resistance. The total-loss basis technology used in commercial hand-held pulse induction metal detectors requires heavy batteries, delivers short battery life, and exhibits sluggish response characteristics resulting from signal integration in the receiver in the quest to improve signal-to-noise ratio in order to have detection sensitivity comparable to ordinary VLF induction balance metal detectors. The apparatus and method of the present disclosure, in contrast, captures flyback energy and recycles it back to the transmit coil.

Corbyn GB Patent Document No. 2,071,327A discloses a pulse induction metal detector including means for balancing out the effects of magnetic viscosity so that metal targets can be detected when buried in magnetically viscous soils. Corbyn also discloses classic "pulse induction" transmitter waveforms. However, energy delivered to the transmit coil in Corbyn is dissipated either during the transmit on-time or during flyback, and no energy is recovered from the collapse of the magnetic field to be reused for subsequent energization of the transmit coil.

Johnson U.S. Pat. No. 4,868,504 discloses a pulse induction system which captures flyback energy by steering it into a DC power supply for later reuse. Johnson discloses a generally triangular-shaped transmit coil current waveform and the flyback voltage is clamped approximately to the DC power supply voltages. The present disclosure, in contrast, exhibits an approximately rectangular-shaped transmit current, and the flyback voltage is typically at least several times as great as the DC power supply voltage.

Candy U.S. Pat. No. 6,686,742 discloses a pulse induction system which captures flyback energy by steering it into a high voltage DC power supply. The coil current waveform of the flyback event is generally similar to that of a total loss system. A DC-DC converter then transfers the energy thus stored back to the main lower voltage DC power supply. The present invention, in contrast, does not have a high voltage DC power supply and does not return the stored energy to a lower voltage DC power supply.

The apparatus and method of the present disclosure provides power consumption efficiency typically several times greater than an otherwise comparable total loss system. The apparatus and method of the present disclosure generates an approximately rectangular coil current waveform providing detection of high conductivity or ferrous metal target objects better than of an approximately saw tooth triangular waveform of the same duration. The apparatus and method of the present disclosure also provides lower voltage stresses on components in the flyback circuit as compared to an otherwise similar total loss system terminating the same current. There is also less radiation of higher-order harmonics as compared to an otherwise similar total loss system and a relatively high rate of change of current at the end of flyback making possible the detection of low conductivity nonferrous metal target objects with good sensitivity.

An illustrated embodiment of the present disclosure includes capacitance added to the transmitter circuit of a pulse induction metal detector. The capacitance both stores energy from flyback at the end of the transmit pulse, and provides energy to initiate the transmit pulse. The amount of capacitance is not large, such as would be necessary to provide a DC voltage, rather it is small such that its resonant period with respect to the transmitter coil inductance is less than twice the nominal transmit period. The voltage waveform at the beginning and ending of the transmit pulse are approximately ¼ cosines. The resulting transmit current is approximately rectangular with approximately ¼ sine leading and trailing edges.

In an illustrated embodiment of the present disclosure, a method is provided for recycling flyback energy in a pulse induction metal detector. The method includes providing a pulsed magnetic field transmitting system including a DC voltage power source having a first end connected to a ground common node, an inductive transmitter coil configured to create a magnetic field for energizing metal objects to be detected by the metal detector, a capacitor having a first end connected to the common node, a first electronic switch connected between a second end of the capacitor and a first end of the coil, a second electronic switch connected between a second end of the coil and the common node, a first rectifier connected between the second end of the coil and the second end of capacitor, and a second rectifier connected between a second end of the power source and the first end of the coil. The first rectifier is adapted to steer electric current from the coil to the capacitor, and the second rectifier is adapted to steer electric current from the power source to the coil. The method also includes operating the transmitting system in a repeating sequence, in quasi-steady-state operation. The repeating sequence includes turning on the first switch and the second switch creating a path for current to flow from the capacitor through the coil to the common node thus discharging the capacitor; turning off the first switch with current continuing to flow in the coil from the power source through the second rectifier; turning off the second switch causing the current flowing through the coil to be steered through the first rectifier to the capacitor thus charging the capacitor; and providing a time interval without current flow in the coil during which eddy currents flowing in metal objects are detected by the metal detector of which the pulsed magnetic field transmitting system is a part.

In another illustrated embodiment of the present disclosure, a quasi-resonant transmitter circuit apparatus for a pulse induction metal detector apparatus is adapted to capture and recycle flyback energy and to transmit a pulsed magnetic field for energizing metal objects to be detected. The transmitter circuit apparatus includes a DC voltage power source having a first end connected to a ground common node; an inductive transmitter coil configured to create a magnetic field for energizing metal objects to be detected by the metal detector; and a capacitor having a first end connected to the common node. The apparatus also includes a first electronic switch connected between a second end of the capacitor and the first end of the coil; a second electronic switch connected between the second end of the coil and the common node; a first rectifier connected between the second end of the coil and the second end of capacitor; and a second rectifier connected between the second end of power source and the first end of the coil. The first rectifier is adapted to steer electric current from the coil to the capacitor, and the second rectifier is adapted to steer electric current from power source to the coil. The apparatus further includes timing means for controlling of an on state and an off state of the first and second switches and so that the transmitter circuit operates in a predetermined repeating sequence, the timing means turning on the first switch and the second switch to create a path for current to flow from the capacitor through the coil to the common node thus discharging the capacitor; then turning off the first switch with current continuing to flow in the coil from the power source through the second rectifier; then turning off the second switch causing the current flowing through the coil to be steered through the first rectifier to the capacitor thus charging the capacitor; and then maintaining the first and second switches in the off state providing a time interval without current flow in the coil during which eddy currents flowing in metal objects are detected by the metal detector of which the transmitter circuit is a part.

Additional features of the present invention will become more apparent to those skilled in the art upon consideration of the following detailed descriptions of illustrative embodiments exemplifying the best mode of carrying out the invention as presently perceived.

BRIEF DESCRIPTION OF THE DRAWINGS

The foregoing aspects and additional features of the present system and method will become more readily appreciated and become better understood by reference to the following detailed description when taken in conjunction with the accompanying drawings.

DETAILED DESCRIPTION OF THE DRAWINGS

Figure 1:
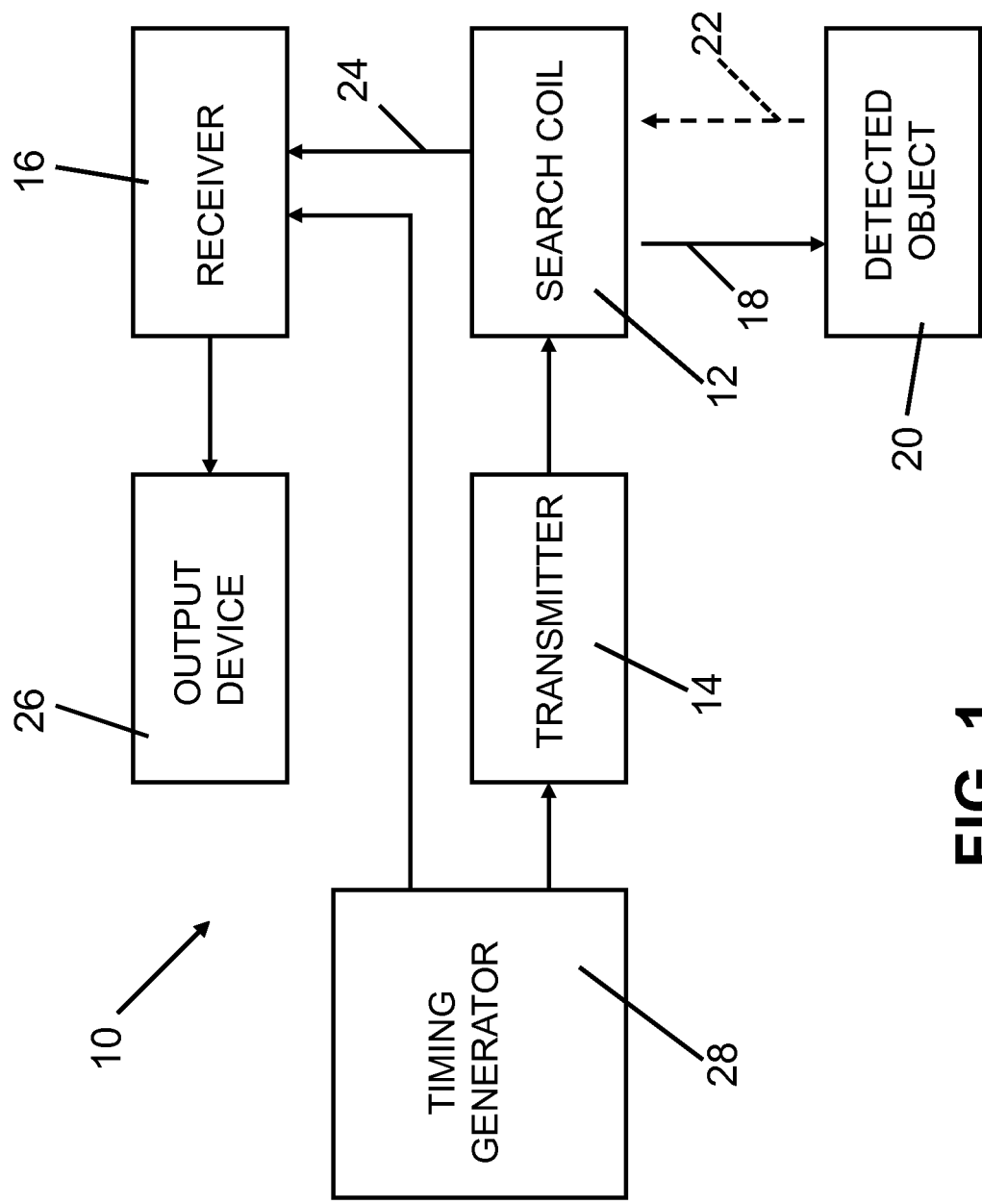
FIG. 1 is a block diagram illustrating components of a metal detector incorporating an illustrated embodiment of the present disclosure.

For the purposes of promoting an understanding of the principles of the present disclosure, reference will now be made to the embodiments illustrated in the drawings, which are described below. The embodiments disclosed below are not intended to be exhaustive nor do they limit the present disclosure to the precise form disclosed in the following detailed description. Rather, the embodiments are chosen and described so that others skilled in the art may utilize their teachings. It is understood that no limitation of the scope of the present disclosure is thereby intended. The present disclosure includes any alterations and further modifications in the illustrated devices and described methods and further applications of the principles of the present disclosure which would normally occur to one skilled in the art to which the present disclosure relates.

Referring now to the drawings, FIG. 1 illustrates a pulse induction metal detector (10) which includes a searchcoil (12) typically connected to a telescopic shaft to facilitate movement of the searchcoil over the ground surface by the operator. The searchcoil (12) is also commonly referred to as a "loop", "search head", or "antenna". Depending on the design of the metal detector (10), the searchcoil (12) may be of the induction balance type with separate transmit and receive coils in the assembly comprising the searchcoil (12), or may be of the so-called "mono" type where a single winding is used first for transmitting and then for receiving. Searchcoils of both the induction balance and "mono" type are well known in the pulse induction metal detector art. Searchcoil (12) may also comprise an assembly including separate transmit and receive coils which (in contrast to induction balance practice) are closely coupled, the separate receive coil facilitating rejection of common mode voltages present in the transmitter circuit.

The transmit coil of the searchcoil (12) is energized by the transmitter circuit (14) to produce a magnetic field (18) which alternately builds up and collapses. Soil, rocks and metal objects (20) within the transmitted magnetic field (18) produce a return field (22) which induces signals in the receive coil of the searchcoil (12), the receive coil being the same as the transmit coil in the case of a "mono" construction of a searchcoil (12). The receive coil of searchcoil (12) is coupled to receiver (16) which processes the received signals (24) to determine the presence of and nature of objects and materials (20) in the magnetic field (18). An output device (26) such as a loudspeaker, headphones, or visual display indicates the presence and/or character of objects and materials (20) within the magnetic field (18). Timing signals necessary to operate transmitter (14) and receiver (16) are provided by a timing generator (28).

An illustrated embodiment of the present invention uses capacitance added to the transmitter circuit (14) of a pulse induction metal detector (10). The capacitance both stores energy from flyback at the end of a transmit pulse, and provides energy to initiate the next transmit pulse. The amount of capacitance is not large, such as would be used to provide a DC voltage. Rather, the capacitance is small, such that a resonant period with respect to the transmit coil inductance is less than twice the nominal transmit period. The voltage waveforms at the beginning and ending of the transmit pulses are approximately ¼ cosines. The resulting transmit current waveform is approximately rectangular, with approximately ¼ sine leading and trailing edges.

The transmitter circuit (14) of the present invention has high energy efficiency. It contains an approximately rectangular transmit current waveform which provides improved sensitivity to high-conductivity objects (20). The current waveform also facilitates the use of an induction balance receiver (16) with induction balance searchcoil (12) designed to detect signals (24) during the transmit time.

Figure 2:
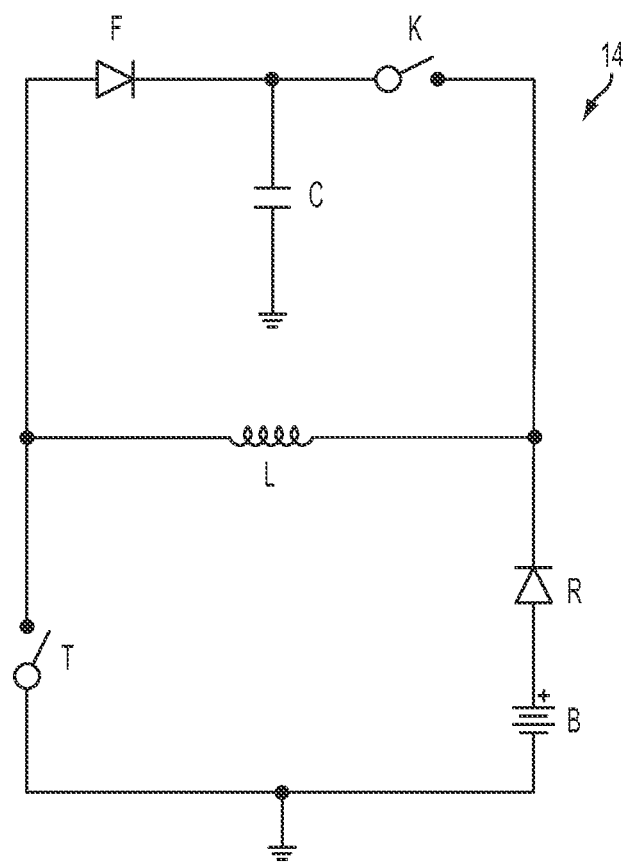
FIGS. 2 and 3 are schematic diagrams of an illustrated embodiment of a transmitter circuit for the metal detector of FIG. 1.

FIG. 2 illustrates a simplified embodiment of a transmitter circuit (14). The DC power source (B) is typically from 4 to 15 volts, and can be either a battery or a regulated DC power supply. At the beginning of a transmit cycle, both the transmit switch (T) and the kickstart switch (K) are closed, connecting the flyback end of the transmit coil (L) to ground and the drive end of the transmit coil (L) to the high voltage present on a quasi-resonant capacitor (C). The high voltage is typically 10 to 40 times as great as the DC power source (B) voltage. This causes the current through the transmit coil (L) to rise very rapidly as the quasi-resonant capacitor (C) is discharged.

When the voltage on the quasi-resonant capacitor (C) drops below the voltage of the DC power source (B), rectifier (R) becomes forward biased and current continues to flow through the circuit loop comprising (B), (R), (L), and (T). Kickstart switch (K) is opened some time after this happens, but not later than the beginning of flyback. The current flowing through the circuit loop comprising (B), (R), (L), and (T) continues to increase because of the continued application of voltage from the power source (B) through (R) to the transmit coil (L).

When the transmit switch (T) is turned off (opened), current continues to flow in the transmit circuit but through a flyback rectifier (F) rather than through transmit switch (T). This charges the quasi-resonant capacitor (C) to a relatively high voltage typically to more than 10 times the voltage of the DC power source (B). The duration of flyback is typically less than ¼ the amount of time that the transmit switch (T) is closed.

Since the embodiment of FIG. 2 is a pulse induction transmitter for a metal detector, the transmitter (14) remains off for a period of time so that the receiver (16) can detect eddy current decay signals from metal targets. When the off period interval is finished, the transmit switch (T) and the kickstart switch (K) are turned on (closed) again to begin a new transmit cycle.

As a matter of convenience, kickstart switch (K) and transmit switch (T) have been described as being turned on simultaneously. However, this is not a defining limitation of the present disclosure. The desired operation is still achieved by turning on transmit switch (T) shortly before turning on kickstart switch (K), or by turning on kickstart switch (K) before turning on transmit switch (T). Discharge of the quasi-resonant capacitor (C) does not actually occur until switches (K) and (T) are both on.

Figure 3:
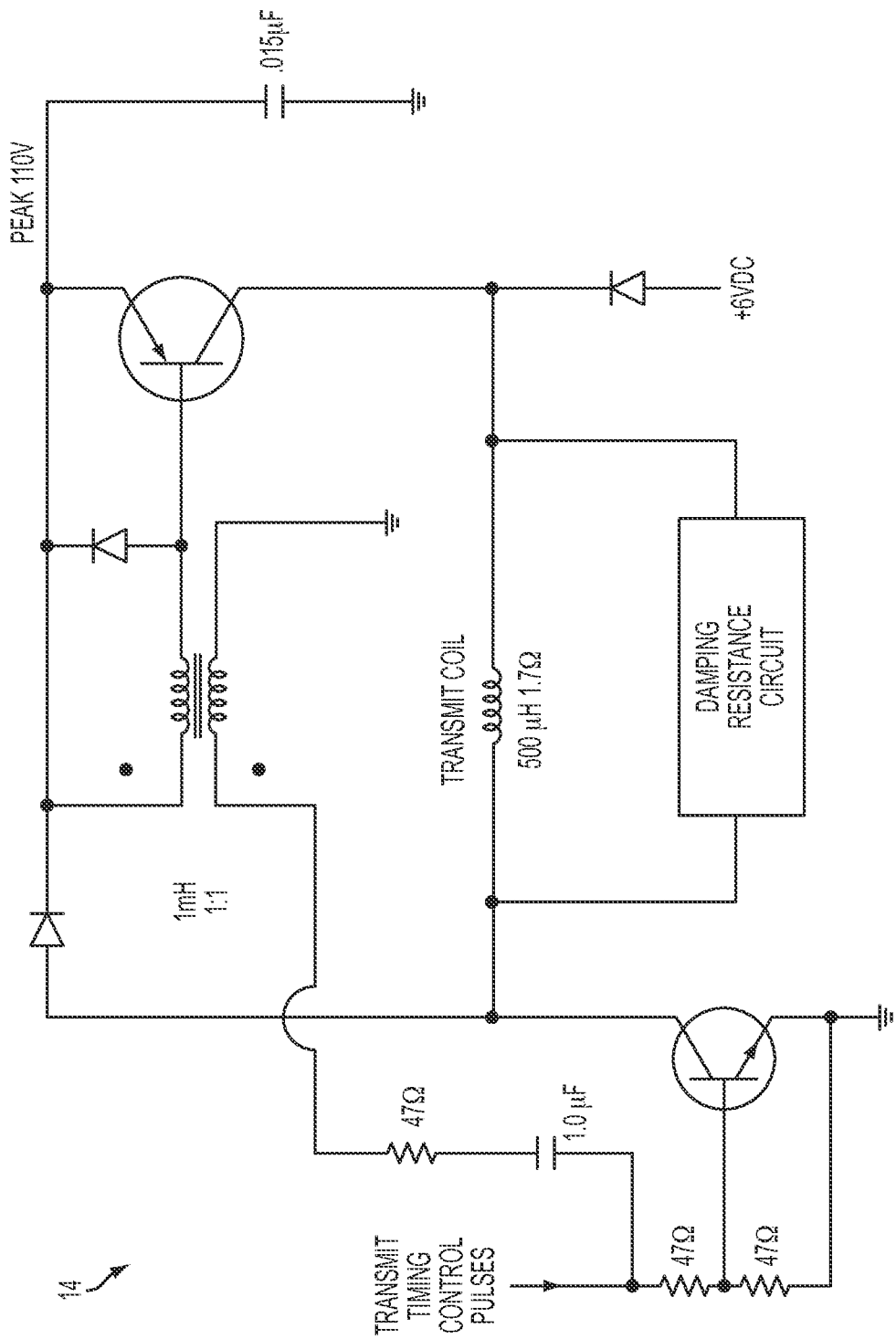
Figure 4:
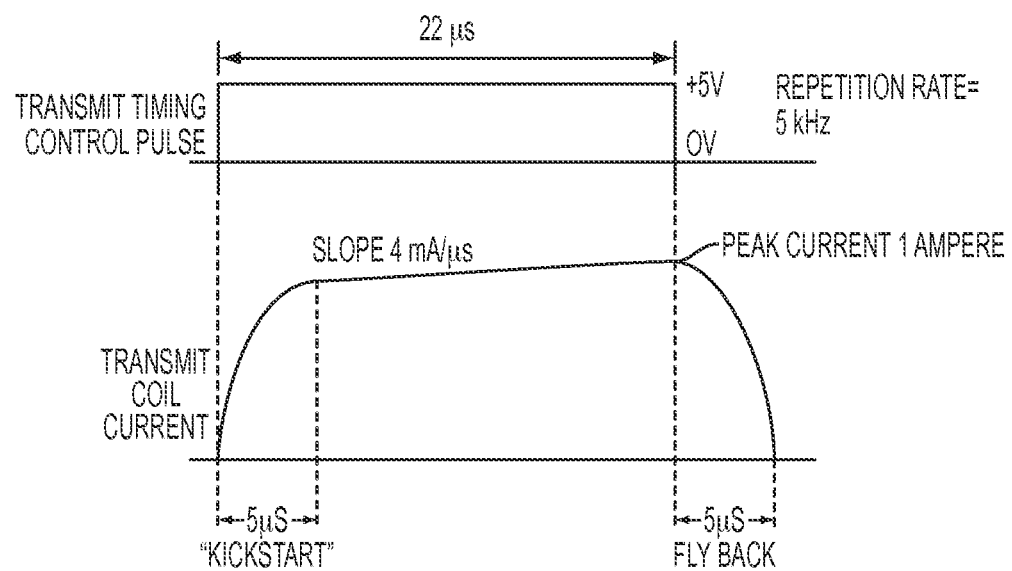
FIG. 4 is a graph illustrating timing and transmit coil current waveform of the embodiment of FIG. 3.

FIGS. 3 and 4 illustrate an embodiment and operation of a transmitter circuit (14) shown in FIG. 2. The voltage, current, timing, and circuit element values shown in FIGS. 3 and 4 are approximate and illustrative. They are representative of what is deemed convenient in a hand-held metal detector intended for locating buried coins and or metal objects. The scope of the present disclosure is not limited by this example and values may change based on desired results.

As shown in FIG. 4, timing generator (28) generates a transmit timing control pulse. In an illustrated embodiment, the control pulse is a +5 V pulse having a duration 22 μs with a repetition rate or frequency of 5 kHz. FIG. 4 also shows a resultant transmit coil current generated in response to the timing control pulse. As discussed above, the transmit coil current includes a kickstart portion occurring at the start of the transmit timing control pulse and a flyback portion occurring after the transmit timing control pulse ends.

As it will be understood by those skilled in the relevant art, transistor switches shown here as bipolar may be MOSFETS or other active devices performing a similar switching function. Also the passive rectifiers shown here may be replaced by active switching elements performing a switching function similar to that performed by the passive rectifiers shown. The scope of the present disclosure is not limited by the choice of specific switching means.

As is customary in pulse induction practice, the circuit of FIG. 3 includes a damping resistance circuit connected across the transmit coil to dampen ringing after flyback. The value of the damping resistance circuit is typically in the range of several hundred to several thousand ohms, and is highly dependent on the specifics of how transmitter (14) inclusive of transmit coil (L) are implemented. In the illustrated embodiment of the present disclosure, the damping resistance is preferably disconnected during the transmit and flyback duration in order to minimize power dissipation. The scope of the present disclosure is not limited by the specifics of the damping resistance circuit.

Figure 5:
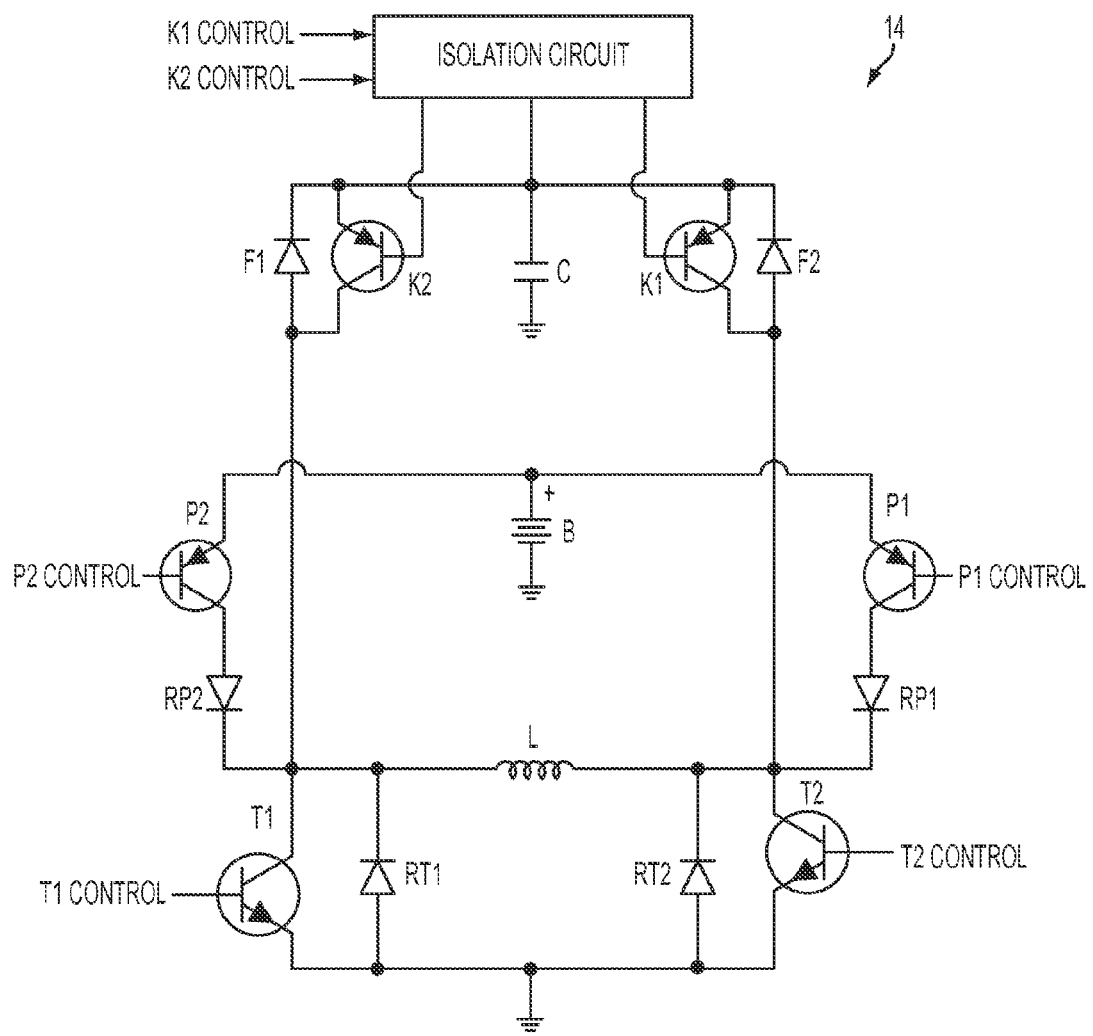
FIG. 5 is a schematic drawing of another embodiment of a transmitter circuit for the metal detector of FIG. 1.

FIG. 5 illustrates a double-ended push-pull embodiment of the present disclosure, operating in accordance with the same basic principles of the embodiment of FIG. 2 which illustrates a single-ended drive circuit topology. In the embodiment of FIG. 5, the direction of current through transmit coil (L) reverses on alternate transmit timing periods. This allows the receiver (16) to operate as a full wave demodulator. This in turn cancels quasi-DC voltages induced in the receiver coil of the searchcoil (12) by earth field, minerals and ferrous metal magnetic remanence without the need to specifically account for it. The push-pull topology of FIG. 5 also minimizes transmission of a net DC magnetic field.

Timing is understood by reference to the embodiments of FIGS. 2 and 4. Control signals alternate between Phase 1 controlling the components of FIG. 5 (K1), (P1) and (T1) and Phase 2 controlling the components (K2), (P2) and (T2). The time interval between initiation of alternating Phases 1 and 2 is typically several times as great as the duration of current flow in the transmit coil (L), the time without current flow being of a duration sufficient to accomplish the receiving function necessary to implement a complete pulse induction metal detector (10).

The double-ended topology of FIG. 5 includes the addition of transistor switches (P1) and (P2) to steer the DC power supply current into the coil (L). They are turned on either (P1, T1, K1) or (P2, T2, K2) but not both, to prevent crowbarring or shorting of the DC power supply (B) to ground and instead to drive the transmit coil (L). For convenience, the push-pull topology is illustrated as being symmetrical with power being fed from both sides.

Push-pull operation may also be achieved by feeding power to one side only. On the phase side where power is connected to the transmit coil (L), current rises through the transmit coil (L) after "kickstart" as illustrated in FIG. 4. On the alternate phase where power is not connected, current decreases through the transmit coil (L) after "kickstart" due to power losses in the transmit circuit. Possible disadvantages in this arrangement include transmission of a net DC field resulting from the impairment of symmetry, and lower operating current and lower flyback voltage. However, in the case of an induction balance searchcoil coupled to a receiver employing full wave demodulation and designed to demodulate signals received while transmit current is flowing, applying power to one phase only causes induction imbalance voltages resulting from the alternating positive and negative slopes of the transmit current to approximately cancel in the low pass filter of the demodulator. This substantially reduces detection of the reactive component of induction imbalance while transmit current is flowing, after "kickstart" and before flyback. Therefore, the scope of the push-pull topology embodiment is not limited to a symmetrical power application, but may also include single side only power application.

While embodiments of the present invention have been described as having exemplary designs, the present invention may be further modified within the spirit and scope of this disclosure. This patent application is therefore intended to cover any variations, uses, or adaptations of the invention using its general principles. Further, this patent application is intended to cover such departures from the present disclosure as come within known or customary practice in the art to which this invention pertains.

What is claimed is:

1. A method for recycling flyback energy in a pulse induction metal detector, the method comprising:
    providing a pulsed magnetic field transmitting system including a DC voltage power source having a first end connected to a ground common node, an inductive transmitter coil configured to create a magnetic field for energizing metal objects to be detected by the metal detector, a capacitor having a first end connected to the common node, a first electronic switch connected between a second end of the capacitor and a first end of the coil, a second electronic switch connected between a second end of the coil and the common node a first rectifier connected between the second end of the coil and the second end of capacitor, and a second rectifier connected between a second end of the power source and the first end of the coil, the first rectifier to steer electric current from the coil to the capacitor and the second rectifier to steer electric current from the power source to the coil; and
    operating the transmitting system in a repeating sequence, in quasi-steady-state operation the repeating sequence comprising:
        turning on the first switch and the second switch creating a path for current to flow from the capacitor through the coil to the common node thus discharging the capacitor;
        turning off the first switch with current continuing to flow in the coil from the power source through the second rectifier;
        turning off the second switch causing the current flowing through the coil to be steered through the first rectifier to the capacitor thus charging the capacitor; and
        providing a time interval without current flow in the coil during which eddy currents flowing in metal objects are detected by the metal detector of which the pulsed magnetic field transmitting system is a part.

2. The method of claim 1, wherein the first and second rectifiers are passive semiconductor rectifiers.

3. The method of claim 1, wherein the first and second rectifiers comprise actively controlled electronic switches for rectifying current flow.

4. The method claim 1, wherein the first switch is turned on before turning on the second switch.

5. The method of claim 1, wherein the second switch is turned on before turning on the first switch.

6. The method of claim 1, wherein the first switch and the second switch are turned off simultaneously.

7. The method of claim 1, wherein the provided time interval without current flow in the coil is greater than a duration of current flow in the coil.

8. The method of claim 1, wherein a voltage to which the capacitor is charged is more than twice a voltage of the power source and a duration of time of current flow through the first rectifier is less than half a duration of time that the second switch is turned on.

9. The method of claim 1, wherein a magnitude of current flow in the coil with respect to time has a generally rectangular shape with a leading edge and a trailing edge, each of the leading and trailing edges having a shape of which is approximately ¼ of a sinusoid.

10. In pulse induction metal detector apparatus, a quasi-resonant transmitter circuit apparatus to capture and recycle flyback energy and to transmit a pulsed magnetic field for energizing metal objects to be detected, the transmitter circuit apparatus comprising:
    a DC voltage power source having a first end connected to a ground common node;
    an inductive transmitter coil configured to create a magnetic field for energizing metal objects to be detected by the metal detector;
    a capacitor having a first end connected to the common node;
    a first electronic switch connected between a second end of the capacitor and a first end of the coil;
    a second electronic switch connected between the second end of the coil and the common node;
    a first rectifier connected between the second end of the coil and the second end of capacitor;
    a second rectifier connected between the second end of power source and the first end of the coil, the first rectifier to steer electric current from the coil to the capacitor and the second rectifier to steer electric current from the power source to the coil; and
    timing means for controlling of an on state and an off state of the first and second switches so that the transmitter circuit operates in a predetermined repeating sequence, the timing means turning on the first switch and the second switch to create a path for current to flow from the capacitor through the coil to the common node thus discharging the capacitor; then turning off the first switch with current continuing to flow in the coil from the power source through the second rectifier; then turning off the second switch causing the current flowing through the coil to be steered through the first rectifier to the capacitor thus charging the capacitor; and then maintaining the first and second switches in the off state providing a time interval without current flow in the coil during which eddy currents flowing in metal objects are detected by the metal detector of which the transmitter circuit is a part.

11. The apparatus of claim 10, wherein the first and second rectifiers are passive semiconductor rectifiers.

12. The apparatus of claim 10, wherein the first and second rectifiers comprise actively controlled electronic switches for rectifying current flow.

13. The apparatus of claim 10, wherein the first switch is turned on before turning on the second switch.

14. The apparatus of claim 10, wherein the second switch is turned on before turning on the first switch.

15. The apparatus of claim 10, wherein the first switch and the second switch are turned off simultaneously.

16. The apparatus of claim 10, wherein the provided time interval without current flow in the coil is greater than the duration of current flow in the coil.

17. The apparatus of claim 10, wherein a voltage to which capacitor is charged is more than twice a voltage of power source and a duration of time of current flow through the first rectifier is less than half a duration of time that the second switch is turned on.

18. The apparatus of claim 10, wherein a magnitude of current flow in the coil with respect to time has a generally rectangular shape with a leading edge and a trailing edge, each of the leading and trailing edges having a shape of which is approximately ¼ of a sinusoid.

19. The apparatus of claim 10, wherein an amount of energy returned to the coil through the first switch is greater than 50% of the magnetic field energy present when the second switch is turned off.

* * * * *